Figure 1:
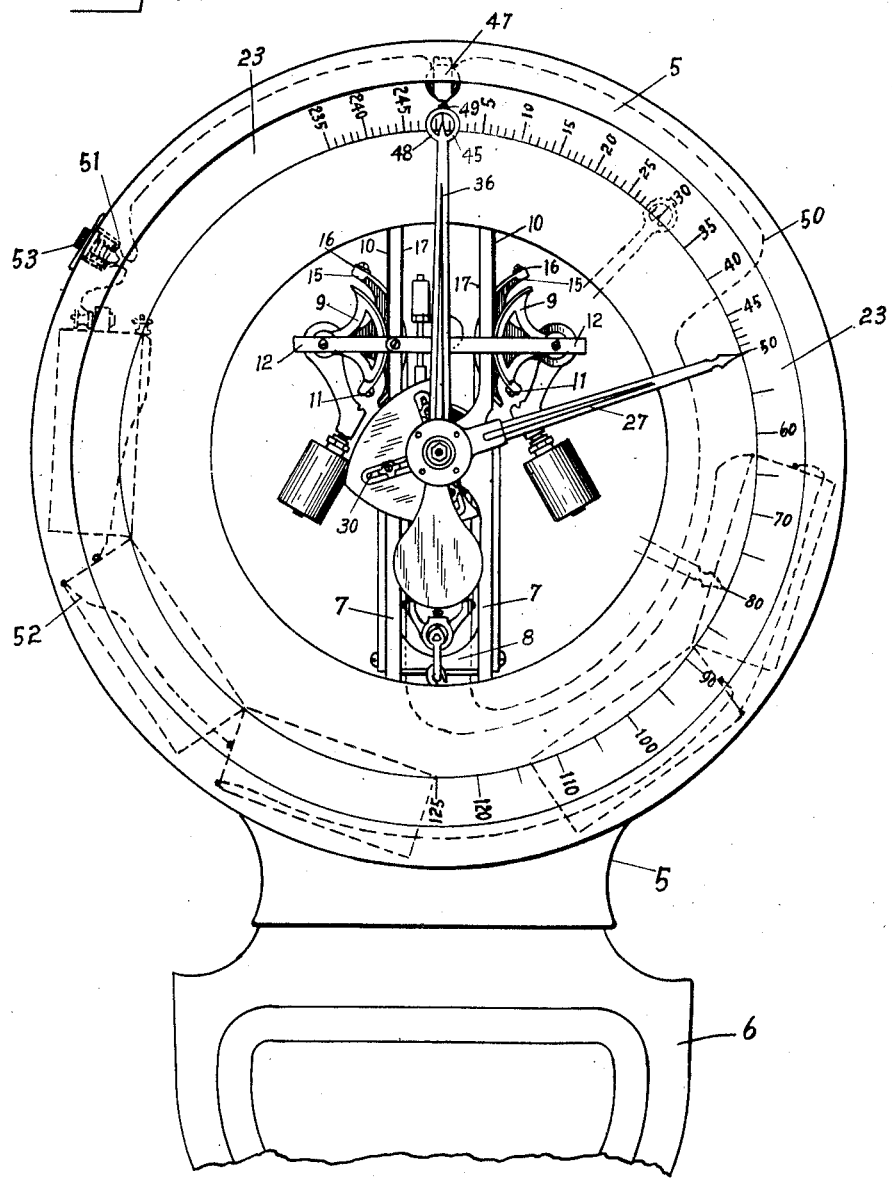

O. C. REEVES.
WEIGHING SCALE.
APPLICATION FILED MAR. 4, 1915.

1,210,204.

Patented Dec. 26, 1916.
3 SHEETS—SHEET 1.

WITNESSES:

INVENTOR.

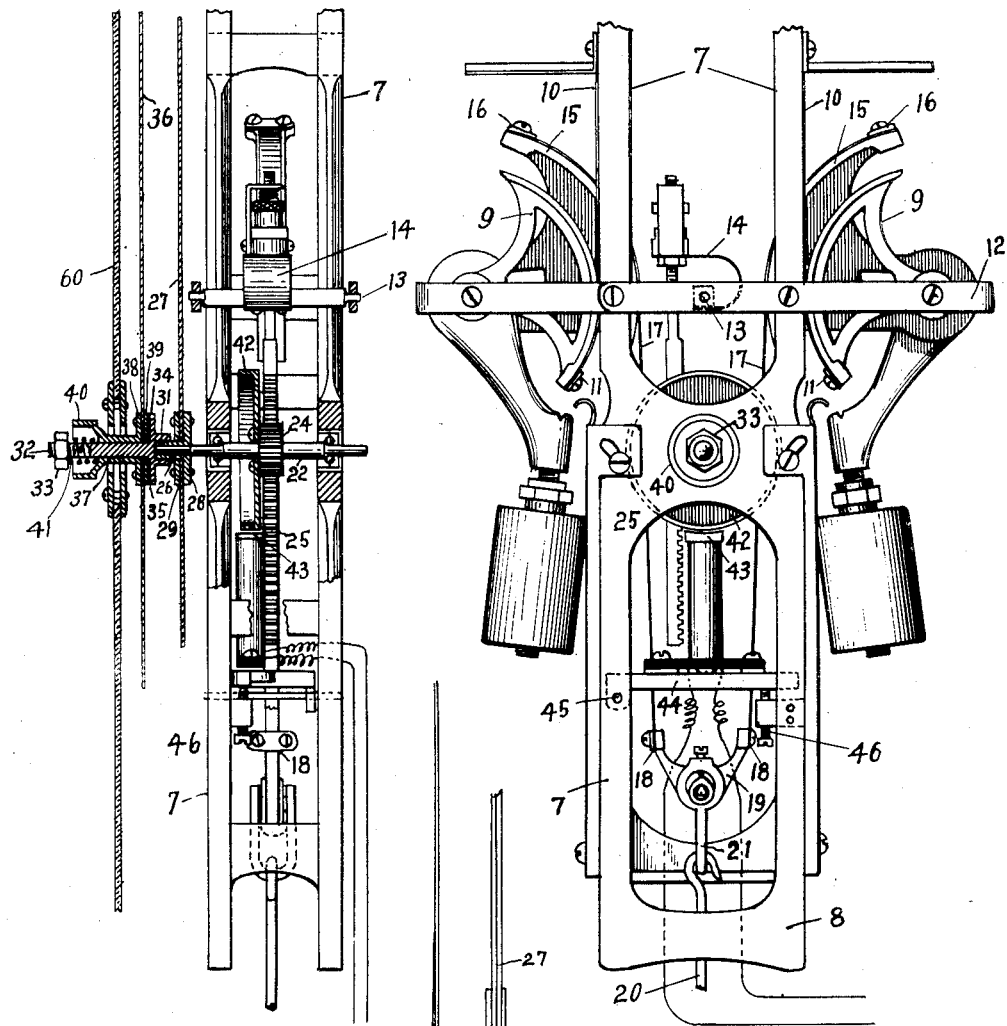

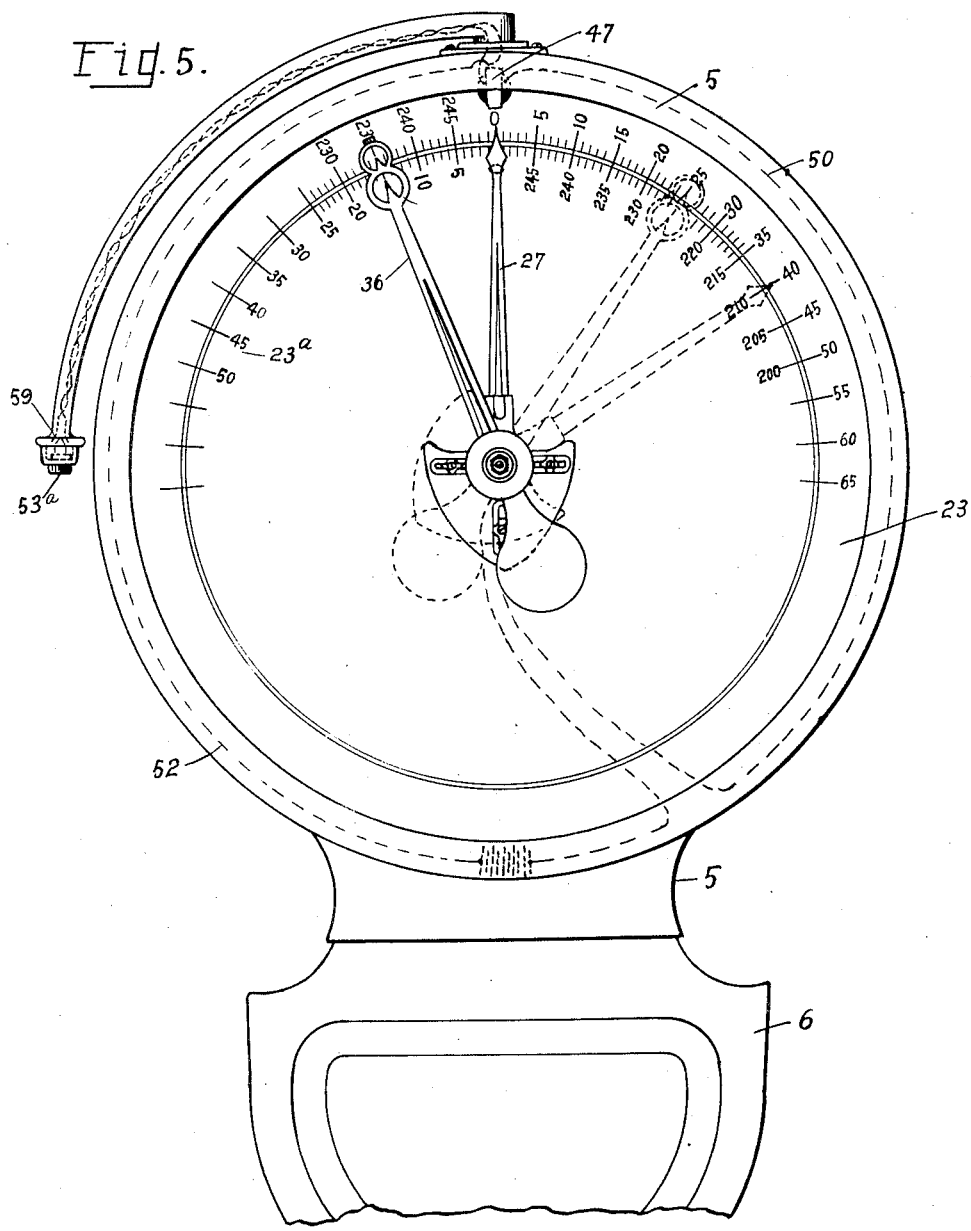

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING-SCALE.

1,210,204.      Specification of Letters Patent.      Patented Dec. 26, 1916.

Application filed March 4, 1915. Serial No. 11,949.

*To all whom it may concern:*

Be it known that I, ORWELL C. REEVES, a citizen of the United States, residing at Toledo, in the county of Lucas and State of Ohio, have invented certain new and useful Improvements in Weighing-Scales, of which the following is a specification.

This invention relates to weighing-scales, and has for an object to provide a scale having indicating means arranged to conveniently and accurately indicate the net, gross, and tare weights of articles being weighed, so that all of these various weights can be immediately ascertained by the operator.

Furthermore, this invention provides a means for indicating multiple weighings, wherein packages or articles may be separately weighed without necessitating the removal of any of them from the scale platform until all have been weighed, thereby enabling the operator to keep together and intact an invoice of goods for delivery or shipment; or for accurately weighing the several ingredients that enter into a compound of medicine, a mixture of bread, cake, etc., or the formula of an alloy of metals, the compounding whereof may be performed without necessitating the removal of the container or holding vessel from the scale platform.

A further object of this invention is to provide a scale having a plurality of indicator hands positioned and arranged to accurately indicate the weights of articles placed upon the scale platform, one or more of said indicating hands being adjustable relatively to the other or others of said indicating hands, enabling the operator to reset one or more of the indicator hands from any desired position without disturbing the position of the remaining indicator hands.

A further object of the invention is to provide a scale that while well adapted to indicate net, gross, and tare weights may be also used as an ordinary weighing machine, indicating in the usual manner only the gross weight of an article placed upon the scale platform, without requiring any change or adjustment in the indicating mechanism of the weighing scale or any other part thereof.

With the above and other objects in view which will more readily appear as the invention is better understood, my invention consists in the novel construction, combination and arrangement of parts to be hereinafter more fully described and particularly pointed out in the subjoined claims.

Reference is to be had to the accompanying drawings, illustrating a preferred embodiment of my invention, and wherein similar reference numerals designate similar parts throughout the several views.

In the drawings, Figure 1 is a front elevation of the upper portion of a scale showing an embodiment of my invention, and portraying in full lines the position of the indicator hands after a 50 pound weight has been placed on the platform and the adjustable indicator hand reset to zero or normal position. Fig. 2 is a transverse vertical section through the center of the weighing and indicating mechanism of the scale, the indicator hands being shown in normal position. Fig. 3 is an enlarged detail elevation of portions of my improved weighing scale. Fig. 4 is an enlarged detail view showing in side elevation the arrangement of the indicator hands relatively to the indicator shaft, and Fig. 5 is a front elevation of the upper portion of a scale showing another embodiment of my invention wherein a supplemental inner chart or series of graduations arranged in a counterclockwise direction is employed.

In the drawings, 5 designates a scale housing adapted to inclose the weighing mechanism of the scale, and supported upon a suitable column 6, the lower end of which is associated with the platform of the scale (not shown). The weighing mechanism of the scale in the embodiments herein shown comprises a rectangular frame having four vertical pillars 7 suitably supported from the wall of the scale housing and secured together at the top and bottom by cross-pieces 8. The pillars 7, as herein shown, form bearings or tracks for rocker segments 9 which have rolling contact thereon, being supported in position by flexible ribbons 10 of steel or other suitable material fastened to the lower ends of the segments, as at 11, and at their upper ends to the pillars, being thus interposed between the pillars and the segments at every position of the latter. The segments 9 are suitably secured in the vertically-movable frame 12, which serves to connect the several segments 9 with each other and through the medium of the pivotally mounted central rod 13 and the resilient connecting member 14 (see Fig. 3) with the indicating mechanism of the scale. Arranged adjacent the supporting segments 9 are somewhat larger segments 15 which are also suitably mounted in the vertically-movable frame 12, said segments extending at their periphery between the pillars 7 at the opposite sides of the rectangular frame and are connected at their upper ends, as at 16, to metallic ribbons 17 which extend over the irregular faces of the segments and are attached at their lower ends, as at 18, to an equalizer-bar 19, as clearly shown in Figs. 1 and 3. The equalizer-bar 19 is suitably connected as by means of a hook-rod 20 and the U-shaped yoke 21 to the platform levers (not shown) supporting the scale platform (not shown). It is to be understood that any suitable platform or platform lever mechanism may be employed in connection with the weighing mechanism of the scale, the weighing mechanism herein shown being designed to operate when employed in various forms of scales, as, for example, in portable, dormant, or hanging scales.

Further, it is to be understood that this invention is not necessarily restricted to use with weighing mechanism of the character herein shown, any suitable mechanism arranged to counterbalance a load placed on the scale platform and accurately drive an indicator shaft through a proportionate arc to indicate the weight thereof being capable of use in connection with my invention, various mechanisms well known in the scale art being fully capable of performing the required functions. The embodiment herein illustrated has, however, been found to successfully demonstrate the capabilities of this invention, and it is therefore illustrated as a preferred form of weighing mechanism.

An indicator shaft 22 is mounted concentrically of the dial 23 and carries a pinion 24 arranged to mesh with a vertically disposed rack 25 connected by the resilient connecting member 14 to the vertically-movable frame 12.

At its forward extremity the shaft 22 is reduced, as shown in Figs. 2 and 4, and carries the hub 26 of a fixed indicator hand 27, the hub 26 being keyed or otherwise suitably secured to the indicator shaft 22 so as to always rotate therewith.

The hub 26 is formed with a circular flange 28 co-acting with a collar 29 in positioning the indicator hand 27, which hand is preferably formed of sheet metal, and adjacent its pivotal point is expanded into a plate which is appropriately slotted, as at 30, to receive small adjustable weights for accurately counterbalancing the hand. (See Fig. 1).

As clearly shown in Fig. 2, the hub 26 of the fixed indicator hand 27 is provided with a forwardly extended threaded portion 31 adapted to engage the internally threaded portion of the projecting shaft 32 to secure said shaft in alinement with the indicator shaft 22, the forward extremity of said shaft 32 projecting through an aperture in the inclosing glass plate 60 and being formed with external threads for the reception of an adjusting nut 33, for a purpose to be hereinafter set forth. The shaft 32 is provided with a flange 34 to the forward face of which is suitably affixed a disk 35 of soft leather, rubber or other friction-producing substance.

The adjustable indicator hand 36 is secured upon a sleeve 37 slidable on the shaft 32 and is clamped between the flange 38 of said sleeve and a collar 39, which collar may carry on its rear face a disk of friction-producing material adapted to co-act with the friction disk 35. At its forward extremity the sleeve 37 is flared and expanded into a knurled knob 40 and within this knurled extension is arranged a coil spring 41 normally pressing the friction disks 35 and 39 into contact with each other, the opposite end of the spring bearing against the sleeve 37 and the adjustable nut 33, the adjustments of the nut 33 upon the threaded extremity of the shaft 32 regulating the tension of the spring.

A disk 42 of soft iron or other magnetic material is suitably secured to rotate with the indicator shaft 22, and immediately adjacent the periphery of the disk 42 is arranged the soft iron nose of a magnetic clutch or brake 43, which, as herein shown, is secured upon a horizontal base 44 which is pivoted, as at 45, to one of the pillars 7 of the rectangular frame. The adjusting bolt 46 is suitably mounted adjacent the free end of the base 44 to regulate the distance between the soft iron nose of the magnetic clutch or brake 43 and the periphery of the disk 42.

As shown in Fig. 1, an electro-magnet is mounted adjacent the periphery of the dial 23 having its pole-piece 47 arranged so that its central portion is in direct alinement with the zero indication of said dial, said electro-magnet serving to automatically center the adjustable hand 36 in alinement with the zero indication of the dial when said hand is brought within the magnetic field of the electro-magnet, the hand 36 being preferably formed with a circular extension 48 carrying a projection 49 of soft iron or other magnetic material. The electro-magnet and the magnetic clutch or brake 43 are formed with suitable wiring connections, and, as herein shown, are connected by wires 50 (shown in dotted lines in Fig. 1) in circuit with each other and the batteries 52 carried within the scale housing, a switch 51, which may be of the well known push-button type, normally maintaining the circuit open, the circuit being closed by pressing the button 53 whenever it is desired to energize the magnetic clutch or brake 43 and the electro-magnet, as hereinafter set forth.

In the operation of the scale, when it is desired to utilize the scale as a net, gross, and tare weight indicator, the container, such as a box or holding vessel is first placed upon the scale platform and both of the indicating hands 27 and 36 are rotated by the weighing mechanism until the weight of the container is indicated on the dial 23, the spring 41 forcing the sleeve 37 and the adjustable hand 36 carried thereby into close contact with the friction disk 35 carried by the flange 34 of the shaft 32 so that the hand 36 is frictionally driven in conjunction with the indicator shaft 22 and the hand 27 fixed thereon. The indicator hand 36 is then manually returned to the zero position as follows: The push-button 53 is pressed, closing the electrical circuit to energize the magnetic clutch or brake 43 and the electro-magnet 47, the soft iron nose of the clutch 43 engaging the periphery of the soft iron disk 42 and locking said disk and indicator shaft 22 with its fixed hand 27 in the position indicating the weight of the container on the scale platform, whereupon the operator grasps the knurled knob 40, sliding the sleeve 37 forward upon the shaft 32 to disengage the collar 39 upon said sleeve from the friction disk 35, and then rotating the knob 40 and the hand 36 to the zero position, the electro-magnet 47 serving to automatically aline this hand 36 with the zero indication on the dial when the soft iron projection 49 on said hand enters the magnetic field of the electro-magnet. The commodity to be weighed is then placed in the container, whereupon the hands 27 and 36 are again rotated until the weight of the commodities are offset, and the net weight of this commodity may be then read on the dial under the pointer of the indicator-hand 36, which had previously been returned to the zero position on the dial, and the gross weight of the container and commodity may be read on the dial under the pointer of the fixed hand 27. The tare—i. e., the weight of the container—is, of course, shown between the fixed and adjustable hands. For example, if a container of 50 pounds is first placed on the scale platform, the two indicator hands 27 and 36 will simultaneously move to the 50 pound graduation on the dial. The push-button is then pressed, the magnetic clutch locking the fixed hand 27 in registration with the 50 pound graduation, and the adjustable hand 36 is manually returned to register with the zero graduation on the dial. If now, 30 pounds of a given commodity is placed in the container, the two hands 27 and 36 will advance in a clockwise direction until they have respectively reached the positions shown in dotted lines in Fig. 1—i. e., the adjustable hand 36, which had been previously returned to zero, will register 30 pounds on the dial (the net weight) and the fixed hand 27 will be moved until it registers 80 pounds on the dial, the total weight of the container and commodity. The tare, or weight of the container, 50 pounds, is shown as the difference between the 30 and 80 pound registrations of the adjustable and fixed hands respectively.

Now the weighing of articles can readily be continued without removing the articles already on the platform, as, for example, the adjustable hand is again returned to zero on the dial after the push-button 53 has been pressed to lock the fixed hand 27 in registration with the 80 pound graduation on the dial, and a weight of, say, 100 pounds could be placed on the scale platform and the adjustable hand 36 would be moved until it registered with the 100 pound graduation on the dial (indicating the last weighing) and the fixed hand 27 would be moved until it registered with the 180 pound graduation on the dial, the total of weight on the platform of the scale. This operation can be repeatedly performed until the full capacity of the dial has been reached, and in case the scale is also equipped with tare and increased capacity beams, the weights thus totaled can be transferred to the tare and increased capacity beams, thereby returning both the fixed and adjustable hands into registration with the zero graduation on the dial and separate weighings and additions could be continued to the full weighing capacity of the scale.

In the modification shown in Fig. 5, a second chart or inner series of graduations 23ª arranged in a counter-clockwise direction or in the opposite direction from the weight graduations 23 adjacent the periphery of the dial is provided for a purpose now to be set forth. When it is desired to use a cask, box, or similar container repeatedly with varied amounts of commodities within the container, the method of procedure could be as follows: The cask, box, or like container is first placed upon the scale platform and its weight ascertained in the usual manner. Assume, for example, that the weight of this container is 15 pounds. The adjustable hand 36 is then moved until its inner pointer registers with the 15 pound graduation on the inner chart 23ª, whereupon, after the cask or like container with, say, 25 pounds of a desired commodity placed therein is again placed on the scale, the fixed hand 27, which before the second placing of the cask upon the scale platform registered with zero on the outer chart, will advance in a clockwise direction until it registers with the 40 pound graduation on the outer chart, 40 pounds being the total weight upon the scale platform. At the same time, the adjustable hand 36, which before the weighing was at a point registering with the 15 pound graduation in the rear of the zero graduation on the outer chart, will advance until its outer pointer registers with the 25 pound graduation on the outer chart, having in the meantime moved exactly the same distance as did the fixed hand 47 in moving from the zero graduation to the 40 pound graduation on the outer chart. It will be evident that since the adjustable hand 36 begins its movement from behind the zero on the outer chart, it will terminate its movement at a point as much behind the new position of the fixed hand as it was spaced from this fixed hand at the beginning of its weighing stroke. Thus, in the illustration shown in Fig. 5, the fixed hand 27 is shown in full lines registering with zero on the outer chart and the adjustable hand 36 is indicated in full lines as registering with the 15 pound graduation on the inner chart, which corresponds with the 235 pound graduation on the outer chart—i. e., is behind the zero graduation of the outer chart a distance such that it will require 15 pounds weight upon the scale platform to return the adjustable hand to zero on the outer chart. In the dotted line positions shown in Fig. 5, the fixed and adjustable hands are shown in the positions they would respectively assume after a weight of 40 pounds has been placed upon the scale platform, the fixed hand 27 advancing to the 40 pound graduation and indicating the total or gross weight upon the platform while the adjustable hand 36 advances to a position registering with the 25 pound graduation on the outer dial, and indicating the net weight of the material placed within a cask or like container weighing 15 pounds. The tare weight is shown as the difference between the 25 pounds indicated by the adjustable hand and the 40 pounds indicated by the fixed hand, or if the tare weight of the cask had not previously been noted, it could be readily determined and a check could be established upon the former reading by noting the position of the adjustable hand 36 behind the zero graduation after the cask and commodity are removed from the scale platform.

As shown in Fig. 5, the push-button 53, used to close the switch 51 in the modification illustrated in Figs. 1–4 inclusive, may be replaced by a push-button or similar switch-closing means 53$^a$ placed in the end of a curved arm 59, which is suitably swiveled so as to be capable of rotation into any desired position relatively to the chart of the scale so as to enable an operator to stand at either side of the scale, or at any desired position before or behind the scale when the weighing is being carried on and yet be in a convenient position to press the push-button 53$^a$ to lock the fixed hand in its adjusted position and allow the adjustable hand to be returned as desired. The electric wires leading to and from the push-button switch 53$^a$ will be suitably arranged, as in series, with the magnet 47 and the magnetic clutch or brake 43.

If it is desired to use the scale for ordinary weighing—i. e., for indicating only one weight of the article being weighed, the index hands may be simultaneously used to indicate the weight desired on the outer chart and since the necessity for providing means for separately indicating tare weight is now obviated, the adjustable hand continues to act in conjunction with the fixed hand 27 to indicate as one composite pointer the weight of any article or articles placed on the scale platform.

While the particular constructions of this invention herein disclosed are well adapted to illustrate the advantages initially set forth, it is to be understood that many other forms and structures may be employed, this invention being susceptible of many modifications, variations, and changes without departing from the spirit and scope of the subjoined claims.

Having described my invention, I claim:

1. In a scale and in combination with the weighing mechanism thereof, a pair of indicator hands adapted to be driven from the weighing mechanism, means for locking one of said indicator hands in any adjusted position, and means for moving the other of said indicator hands relatively to the locked indicator hand.

2. In a scale and in combination with the weighing mechanism thereof, a pair of indicator hands adapted to be driven from the weighing mechanism, electrically-actuated means for locking one of said indicator hands in any adjusted position, and means for moving the other of said indicator hands relatively to the locked indicator hand.

3. In a scale and in combination with the weighing mechanism thereof, a pair of indicator hands adapted to be driven from the weighing mechanism, electrically-actuated means for locking one of said indicator hands in any adjusted position, and manually-operated means for moving the other of said indicator hands relatively to the locked indicator hand.

4. In a scale and in combination with the weighing mechanism thereof, a pair of indicator hands arranged to be simultaneously driven from the weighing mechanism, electrical mechanism and connections whereby one of the indicator hands may be held in any adjusted position, and means for moving the other of said indicator hands while the first-mentioned indicator hand is so held.

5. In a scale and in combination with the weighing mechanism thereof, indicating mechanism comprising a pair of indicator hands, one of which is arranged to be driven from the weighing mechanism of the scale, means normally holding the second of said indicator hands in position to be driven from the first-mentioned indicator hand, and means for allowing independent movement of the second indicator hand relatively to the first indicator hand in any adjusted position of the latter.

6. In a scale and in combination with the weighing mechanism thereof, indicating mechanism including a shaft adapted to be rotated upon movement of the weighing mechanism, an indicator hand affixed to said shaft, a second indicator hand arranged to be driven from said shaft, means for allowing independent movement of the second indicator hand relatively to the shaft, and means for locking the shaft against movement in any adjusted position.

7. In a scale and in combination with the weighing mechanism thereof, indicating mechanism including a shaft adapted to be rotated upon movement of the weighing mechanism, an indicator hand affixed to said shaft, a second indicator hand arranged to be driven from said shaft, means for allowing independent movement of the second indicator hand relatively to the shaft, and electrically-actuated means for locking the shaft against movement in any adjusted position.

8. In a scale and in combination with the weighing mechanism thereof, indicating mechanism including a shaft adapted to be rotated upon movement of the weighing mechanism, a disk carried by said shaft, a second indicator hand arranged to be driven from said shaft, means for allowing independent movement of the second indicator hand relatively to the shaft, and electrically-actuated means co-acting with said disk for locking the shaft against movement in any adjusted position.

9. In a scale and in combination with the weighing mechanism thereof, a pair of indicator hands, connections therefrom to the weighing mechanism whereby said hands are simultaneously actuated from the weighing mechanism, and means for locking one only of said indicator hands in any adjusted position.

10. In a scale and in combination with the weighing mechanism thereof, a pair of indicator hands, connections therefrom to the weighing mechanism whereby said hands are simultaneously actuated from the weighing mechanism, and electric means for locking one only of said indicator hands in any adjusted position.

11. In a scale and in combination with the weighing mechanism thereof, a pair of indicator hands, connections therefrom to the weighing mechanism whereby said hands are simultaneously actuated from the weighing mechanism, and a magnetic clutch or brake for locking one only of said indicator hands in any adjusted position.

12. In a scale and in combination with the weighing mechanism thereof, a pair of indicator hands, connections therefrom to the weighing mechanism whereby said hands are simultaneously actuated from the weighing mechanism, and means for holding one of said indicator hands in any adjusted position, including a disk arranged to be rotated in conjunction with the indicator hands and a magnetic clutch or brake co-acting with said disk.

13. In a scale, a dial having a chart with weight graduations thereon, a second chart on said dial having similar graduations extending in the opposite direction from those of the first-mentioned chart, and a pair of indicator hands acting in conjunction with said charts in indicating weights, one of said hands being adjustable relatively to the other.

14. In a scale, a dial having a chart with weight graduations thereon, a second chart on said dial having similar graduations extending in the opposite direction from those of the first-mentioned chart, and a pair of indicator hands acting in conjunction with said charts in indicating weights, one of said hands being adjustable relatively to the other, and means for locking one of said hands in any adjusted position.

15. In a scale, a dial having a chart with weight graduations thereon, a second chart on said dial having similar graduations extending in the opposite direction from those of the first-mentioned chart, and a pair of indicator hands acting in conjunction with said charts in indicating weights, one of said hands being adjustable relatively to the other, and electrically-actuated means for locking one of said hands in any adjusted position.

16. In a scale and in combination with the weighing mechanism thereof, a shaft adapted to be rotated upon movement of the weighing mechanism, an indicator hand affixed to said shaft, a second shaft connected to the first-mentioned shaft to rotate therewith, a friction disk carried by said second-mentioned shaft, a second indicator hand freely mounted upon the second-mentioned shaft, and means for normally holding the second indicator hand in close contact with the friction disk to compel the rotation of the second indicator hand.

17. In a scale and in combination with the weighing mechanism thereof, a pair of indicator hands arranged to be driven upon movement of the weighing mechanism, and means for locking one of said indicator hands in any position, said means including an electric clutch or brake adjacent the indicator hands, and manually-operated switch means for energizing said electric clutch or brake.

18. In a scale and in combination with the weighing mechanism thereof, a pair of indicator hands arranged to be driven upon movement of the weighing mechanism, and means for locking one of said indicator hands in any position, said means comprising an electrical circuit including a magnetic clutch or brake arranged adjacent the indicator hands, and a switch arranged in position to be manually actuated to complete the circuit.

19. In a scale, a chart having weight indications thereon, a pair of indicator hands acting in conjunction with said chart to indicate weights, electric means for locking one of said indicator hands in any adjusted position, said means including a switch arranged to be moved relatively to said chart.

20. In a scale, a chart having weight indications thereon, a pair of indicator hands acting in conjunction with said chart to indicate weights, electric means for locking one of said indicator hands in any adjusted position, said means including a switch, and a swiveled arm mounted adjacent the chart in which the switch may be arranged, whereby the switch may be moved relatively to the chart.

21. In a scale, a chart having weight graduations thereon, a pair of indicator hands acting in conjunction with said chart in indicating weights, means for locking one of said indicator hands in any adjusted position, means for moving the other of said indicator hands relatively to the locked indicator hand, and means for automatically alining the adjustable hand with the zero graduation of said chart.

22. In a scale, a chart having weight graduations thereon, a pair of indicator hands acting in conjunction with said chart in indicating weights, means for locking one of said indicator hands in any adjusted position, means for moving the other of said indicator hands relatively to the locked indicator hand, and means for automatically alining the adjustable hand with the zero graduation of said chart, said alining means including a magnet arranged adjacent the zero graduation of the chart.

ORWELL C. REEVES.

Witnesses:
H. H. BERGEN,
C. WM. FESSENDEN.